March 18, 1941.    G. B. ZIMMERMAN    2,235,133
HYDROCARBON CONVERSION
Filed Oct. 16, 1939
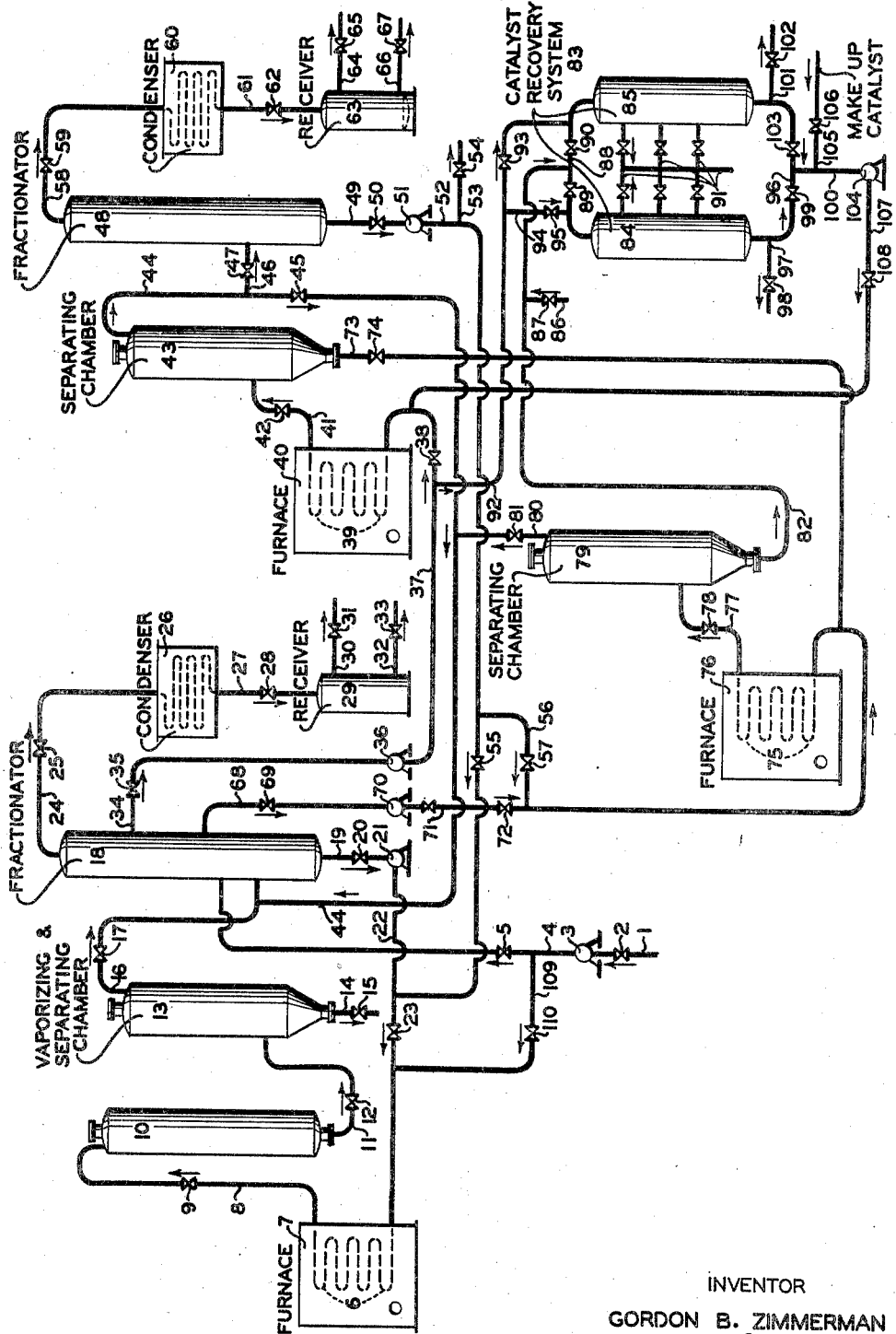
INVENTOR
GORDON B. ZIMMERMAN
BY Lee J Gary
ATTORNEY Patented Mar. 18, 1941

2,235,133

UNITED STATES PATENT OFFICE 2,235,133

HYDROCARBON CONVERSION

Gordon B. Zimmerman, Chicago, Ill., assignor to Universal Oil Products Company, Chicago, Ill., a corporation of Delaware Application October 16, 1939, Serial No. 299,597

11 Claims. (Cl. 196—49)

This invention relates to a hydrocarbon conversion process and more specifically to a process wherein charging oil and intermediate conversion products are converted into more valuable products by both catalytic and non-catalytic treatments.

In attaining the object of the invention, I have developed a new and novel process wherein a catalyst slurry is used in the most advantageous manner. Advantages inherent in a process employing powdered catalysts will become apparent after reading the specifications; however, one of particular note is the greater use of regeneration of the catalyst since the catalyst may be removed to a separate regenerating zone where it undergoes treatment under optimum conditions to restore its activity.

One feature of particular note is the means shown for first using the catalyst slurry in the step wherein the most refractory intermediate conversion products are cracked and thereafter supplying the residue and catalyst from the first catalytic conversion step to a second catalytic conversion step in which the less refractory intermediate conversion products are cracked.

Another feature of this invention is the provision for producing aviation gasoline, when desired. In this case, relatively lower temperatures, higher pressures, and lower space velocities, are employed in the first catalytic cracking step wherein the most refractory intermediate conversion products are cracked, as compared to the temperatures, pressures and space velocities employed in the ordinary catalytic cracking treatment. The vaporous conversion products from this treatment are separately fractionated to separate gasoline from the higher boiling conversion products and the latter are supplied to either the thermal cracking step or the second catalytic cracking step to which the more refractory intermediate conversion products are supplied.

One specific embodiment of the invention comprises subjecting charging oil, together with heavy reflux condensate, formed as hereinafter described, to thermal cracking treatment, separating non-vaporous liquid residue from the vaporous conversion products and recovering the former, fractionating said vaporous conversion products, together with other vaporous conversion products, formed as hereinafter described, to separate fractionated vapors boiling in the range of gasoline from the intermediate conversion products, condensing the latter as reflux condensate and separating the same into two light reflux condensate fractions and heavy reflux condensate, supplying said heavy reflux condensate to said thermal cracking treatment, as aforesaid, condensing and recovering said fractionated vapors as a product of the process, commingling at least a portion of the lighter of said light reflux condensate fractions with a catalyst slurry, formed as hereinafter described and subjecting the mixture to conversion treatment at a cracking temperature and pressure, separating vaporous conversion products from non-vaporous liquid residue and catalyst and commingling the former with the first mentioned vaporous conversion products as one portion of said other vaporous conversion products, commingling the non-vaporous liquid residue and catalyst from the second conversion treatment with the heavier of said light reflux condensate fractions and subjecting the mixture to conversion at a cracking temperature and pressure, separating non-vaporous liquid residue and catalyst from the vaporous conversion products formed in the last mentioned conversion treatment and commingling the latter with the first mentioned vaporous conversion products as another portion of said other vaporous conversion products, commingling the non-vaporous liquid residue and catalyst separated in the third mentioned separating treatment with a diluent, separating the diluent containing the dissolved non-vaporous liquid residue from the catalyst and recovering the former, commingling the other portion of the lighter of said light reflux condensate fractions with said catalyst and supplying the slurry to the second mentioned conversion treatment, as hereinbefore set forth.

Other features of the invention, not previously recited, will become apparent after reading the specifications which follow in conjunction with the attached diagrammatic drawing. The drawing illustrates in conventional side elevation one specific form of apparatus which may be used to accomplish the objects of the invention. It is not drawn to any exact or relative scale the intention being that it serve only as an illustration.

Referring now to the drawing, heavy combined fuel, formed as hereinafter described, is introduced to heating coil 6. The oil in passing through heating coil 6 is raised to the desired cracking temperature which may range, for example, from 850 to 1000° F. with substantial pyrolytic cracking being effected by means of heat supplied from furnace 7. The conversion products leaving heating coil 6 at a superatmospheric pressure ranging, for example, from 100 to 500 pounds or more per square inch are directed through line 8 and valve 9 into reaction chamber 10 where they are subjected to prolonged conversion under cracking conditions.

Reaction chamber 10 is preferably maintained at substantially the same or at a slightly reduced pressure relative to that employed on the outlet of heating coil 6 and is preferably insulated to reduce radiation losses therefrom, although no insulation appears in the drawing. The resultant conversion products from reaction chamber 10 are directed through line 11 and valve 12 into vaporizing and separating chamber 13, which is preferably maintained at a substantially reduced pressure relative to that employed in chamber 10, and it may range, for example, from 50 to 200 pounds or more per square inch. The vaporous and liquid conversion products supplied to chamber 13 are separated therein and the liquid conversion products subjected to substantial further vaporization to form a non-vaporous liquid residue which is removed by way of line 14 and valve 15 and recovered as a product of the process.

The vaporous conversion products, together with vapors evolved in chamber 13, are directed through line 16 and valve 17, commingled with other vaporous conversion products formed as hereinafter described, and the mixture supplied to fractionator 18. Fractionator 18 and the condensing and collecting equipment connected therewith is preferably operated at a pressure substantially the same as that maintained in chamber 13. The vaporous materials introduced to fractionator 18 are fractioned therein to separate fractionated vapors boiling in the range of gasoline from the intermediate conversion products and the latter condensed as reflux condensate and separate into two light reflux condensate fractions and heavy reflux condensate.

Charging oil for the process which may comprise crude oil or any fraction thereof, and especially in the case where it contains light ends boiling in the range of gasoline and in the range of the two light reflux condensate fractions, may be introduced to fractionator 18 and fractionated therein in commingled state with the vaporous materials, introduced as previously described, in which case, gasoline boiling range hydrocarbons would be removed along with the fractionated vapors and the heavier hydrocarbons of the charging oil separated along with the light and heavy reflux condensate fractions to form light and heavy combined feed fractions. In this case, the charging oil would be supplied through line 1 and valve 2 into pump 3, which discharges through line 4 and valve 5 into fractionator 18, and the heavy combined feed fraction formed therein directed through line 19 and valve 20 into pump 21, which discharges through line 22 and valve 23 into heating coil 6, for treatment as previously described. On the other hand, when the charging oil contains no hydrocarbons boiling in the range of gasoline or in the range of the light reflux condensate fractions, it may be commingled with the heavy reflux condensate fraction separated in fractionator 18, as previously described, and removed therefrom by way of line 19, valve 20, pump 21, line 22, and valve 23 by directing the charging oil in line 4 through line 109 and valve 110 into line 22, and the combined feed in line 22 thereafter supplied to heating coil 6, for treatment as previously described.

Fractionated vapors separated in fractionator 18 are directed through line 24 and valve 25 to cooling and condensation in condenser 26. Distillate, together with undissolved and uncondensed gases from condenser 26, is directed through line 27 and valve 28 into receiver 29 where the gas and distillate are collected and separated. Undissolved and uncondensed gases in receiver 29 are removed from the upper portion thereof by way of line 30 and valve 31 and recovered as a product of the process. A portion of the distillate collected and separated in receiver 29 may be returned to the upper portion of fractionator 18, by well known means not shown, to serve as a refluxing and cooling medium. The remaining portion of the distillate in receiver 29 is removed therefrom by way of line 32 and valve 33, subjected to further treatment or recovered as a product of the process.

The lighter of the light reflux condensate fractions separated in fractionator 18 is directed through line 34 and valve 35 to pump 36. Pump 36 discharges through line 37 and a portion of the fraction is directed through line 92 for use in forming the catalyst slurry, as hereinafter described. The remaining portion of the reflux condensate in line 37 is directed through valve 38, commingled with the catalyst slurry, formed in the manner to be described later, and the mixture introduced to heating coil 39. The mixture in passing through heating coil 39 is raised to the desired cracking temperature and is maintained at this temperature for a sufficient period of time for cracking to be effected, heat being supplied by means of furnace 40. The temperatures and liquid hourly space velocities employed in heating coil 39 may vary considerably depending upon the product desired. For example, when it is desired to produce a relatively low bromine number aviation gasoline in this step, temperatures on the order of 500 to 900° F. and liquid hourly space velocities of from .5 to 2 may be employed in heating coil 39. On the other hand, when it is desired to produce a relatively high octane motor fuel in this step, higher temperatures on the order of 900 to 1200° F. and higher liquid hourly space velocities in the range of 2 to 10 may be employed in heating coil 39. Pressures employed in heating coil 39 will vary over a relatively wide range, also depending upon the particular products desired. Generally speaking, when operating to produce aviation gasoline, higher pressures will be employed. In either case, however, pressures ranging from substantially atmospheric to 250 pounds or more per square inch will give satisfactory results.

The conversion products from heating coil 39, in either case, are directed through line 41 and valve 42 into separating chamber 43, which is operated at substantially the same or at a slightly reduced pressure relative to that employed on the outlet of heating coil 39. In chamber 43 vaporous conversion products are separated from the liquid conversion products, the latter also containing the partly used catalyst. Vaporous conversion products separated in chamber 43 are directed through line 44, and when high temperature operation is practiced in heating coil 39 to produce substantial yields of motor gasoline, all of the vaporous conversion products in line 44 are directed through valve 45, commingled with vaporous conversion products formed in a second catalytic cracking treatment and the mixture of vapors commingled with the vaporous products from chamber 13, as previously described. However, when relatively low temperatures are employed in heating coil 39 to produce aviation gasoline, all of the vaporous conversion products in line 44 are directed through line 46 and valve 47 into fractionator 48 which may be operated at substantially the same pressure as that employed in chamber 43. Fractionator 48 is provided for the purpose of separating an aviation gasoline from the higher boiling intermediate conversion products, the latter being condensed as reflux condensate. The reflux condensate formed in fractionator 48 is directed through line 49 and valve 50 into pump 51. Pump 51 discharges through line 52 and a portion or all of the reflux condensate may be recovered as a product of the process by way of line 53 and valve 54. Preferably, however, it is supplied to either the thermal cracking treatment or to another catalytic cracking treatment, and this may be accomplished by directing it either through valve 55 into line 22 where it commingles with the heavy reflux condensate, formed as previously described, after which it is subjected to thermal cracking treatment or it may be directed through line 56 and valve 57 into line 71 where it commingles with the heavier of the light reflux condensate fractions separated in fractionator 18 after which it is subjected to catalytic cracking treatment as hereinafter described.

Fractionated vapors suitable as aviation gasoline separated in fractionator 48 are directed through line 58 and valve 59 to cooling and condensation in condenser 60. The distillate, together with undissolved and uncondensed gases from condenser 60, is directed through line 61 and valve 62 into receiver 63 for collection and separation. The undissolved and uncondensed gases collected and separated in receiver 63 are removed therefrom by way of line 64 and valve 65. A portion of the distillate collected and separated in receiver 63 may be returned to the upper portion of fractionator 48, by well known means not shown, as a refluxing and cooling medium. The remaining portion of the distillate collected in receiver 63 is recovered as a product of the process by way of line 66 and valve 67.

The heavier of the light reflux condensate fractions separated in fractionator 18 is directed through line 68 and valve 69 to pump 70, which discharges through line 71 and valve 72. The reflux condensate in line 71 is commingled with reflux condensate introduced by way of line 56, as previously described, when such procedure is desired, and the material in line 71 thereafter commingled with the liquid residue and catalyst removed from chamber 43 by way of line 73 and valve 74, after which the mixture is supplied to heating coil 75. Since the catalyst separated in chamber 43 is at most partly spent after being utilized in cracking the most refractory of the two light reflux condensates, it still contains sufficient activity for cracking the less refractory of the two materials.

The materials introduced to heating coil 75 are subjected to conversion therein at a temperature ranging, for example, from 900 to 1200° F. and at a pressure ranging, for example, from substantially atmospheric to 100 pounds or more per square inch, heat being supplied from furnace 76. The conversion products, together with catalysts discharged from heating coil 75, are directed through line 77 and valve 78 into separating chamber 79 which is operated at substantially the same or at a slightly reduced pressure relative to that employed on the outlet of heating coil 75. Separation is effected in chamber 79 between the vaporous conversion products and the non-vaporous liquid residue and catalyst, the latter material being collected as a sludge or slurry in the lower portion thereof. Vaporous conversion products separated in chamber 79 are directed through line 80 and valve 81 into line 44 by means of which they are conveyed either alone or in commingled state with the vaporous conversion products from chamber 43 into line 16, for treatment as previously described.

The mixture of non-vaporous liquid residue and catalyst separated in chamber 79 is directed through line 82 to catalyst recovery system 83 for recovery and regeneration of the spent catalyst. Recovery system 83 may comprise, for example, chambers 84 and 85 which are used alternately as the receiver for the spent catalyst and residue from chamber 79. When chamber 84 is being used as the receiver the mixture in line 82, preferably after the introduction of a suitable diluent, such as, for example, intermediate conversion products formed in the system or light material introduced from an outside source by way of line 86 and valve 87 to cut the viscosity of the liquid residue, is introduced to line 88 and directed through valve 89 into receiver 84, valve 90 being closed. When chamber 84 is filled to the desired level, valve 89 may be closed and valve 90 opened and the mixture introduced to chamber 85. The mixture introduced to chamber 85 is thereafter allowed to settle and the liquid material collected in the upper portion thereof decanted off by way of recovery lines 91, leaving catalyst as the residue in the lower portion of chambers 84, and the former subjected to any desired further treatment for the recovery of diluent and liquid residue. Provisions may be made for regenerating the catalyst in situ or, when desired, portions of the catalyst may be removed from chamber 84, as subsequently described, for regeneration and, when desired, recovery of the totally spent catalyst in a zone external to recovery system 83. In some cases, regeneration may be necessary only after relatively long periods of use, the extraction step being sufficient to restore activity to the catalyst, in which case, after the settling periods, the catalysts in either chamber 84 or 85 would be ready for use.

When the catalysts in either chamber 84 or 85 are ready for use, a portion of the lighter of the light reflux condensates in line 37 is directed through line 92 and thereafter supplied to chamber 85 by way of line 92 and valve 93, or to chamber 84 by way of line 94, valve 95, and line 88 to form a slurry of the catalysts contained therein. The catalyst slurry may be removed from chamber 84 by way of line 96 and a portion recovered, when desired, by way of line 97 and valve 98, and the remaining portion directed through valve 99 into line 100. When chamber 85 is being used the slurry may be removed by way of line 96 and, when desired, a portion recovered by way of line 101 and valve 102, the remaining portion being directed through valve 103 into line 100. In any case, the catalyst slurry in line 100 is supplied to pump 104 with or without the addition of make-up catalysts introduced by way of line 105 and valve 106. Pump 104 discharges through line 107 and valve 108 into line 37, for use as previously described.

The preferred cracking catalysts for use in the present process consist in general of a precipitated alumina hydrogel and/or zirconia hydrogel composited with silica hydrogel, the gel composite being washed, dried, ground, and calcined to produce a catalyst mass. The invention, however, is not limited to these particular catalysts, for other catalysts, such as, for example, the hydrosilicates of alumina, acid treated clays, and the like, may be used within the broad scope of the invention.

In the following specification and claims the terms silica, alumina, silica-zirconia, and silica-alumina-zirconia masses are used in the broad sense to designate the synthetic composites referred to above. The preferred catalysts may be prepared by precipitating silica from a solution as a hydrogel within or upon which the alumina and/or zirconia are deposited also by precipitation as hydrogels. The silica hydrogel may conveniently be prepared by acidifying an aqueous solution of sodium silicate by the addition of a required amount of hydrochloric acid. After precipitating, the silica gel is preferably washed until substantially free from alkali metal salts. The washed silica hydrogel is then suspended in a solution of alumina and/or zirconium salts and an alkaline precipitant, such as ammonium hydroxide, ammonium carbonate or ammonium sulfide added to the solution to precipitate aluminum and/or zirconium hydrogels. The final precipitate, comprising essentially hydrated silica and hydrated alumina and/or zirconia, is washed to substantially completely remove water soluble materials and dried at about 300° F. to produce a rather crumbly and granular material which may be ground and sized after which the catalyst particles of the desired size are calcined at a temperature in the approximate range of 1000 to 1500° F. Various other procedures, such as, for example, co-precipitation of the hydrated gels may be employed, when desired, to produce the preferred catalyst.

An example of one specific operation of the process as it may be accomplished in an apparatus such as illustrated and above described is approximately as follows:

Heavy combined feed, formed as hereinafter described, was subjected to pyrolytic conversion in a heating coil and communicating reaction chamber at a temperature of 930° F. and at a superatmospheric pressure of 200 pounds per square inch. The conversion products were supplied to a reduced pressure vaporizing and separating chamber maintained at a superatmospheric pressure of 50 pounds per square inch to separate the vaporous conversion products from the non-vaporous liquid residue and the latter was recovered as a product of the process.

The vaporous conversion products were commingled with other vaporous conversion products, formed as hereinafter described, and the mixture supplied to a fractionating zone operated at substantially the same pressure as that employed in the vaporizing and separating chamber and the mixture commingled therein with the charging oil, the latter comprising a 36° A. P. I. gravity Mid-Continent crude oil. Fractionation of the vaporous conversion products and charging oil resulted in the separation of fractionated vapors boiling in the range of gasoline and in the formation of two light combined feed fractions and a heavy combined feed fraction. The heavy combined feed fraction was subjected to treatment, as previously described. Fractionated vapors were subjected to cooling and condensation and the resulting distillate and gas recovered as products of the process.

A portion of the lighter of the two light combined feed fractions was mixed with a powdered silica-alumina-zirconia catalyst and the resulting slurry commingled with the residual portion of the lighter of the two light combined feed fractions. The mixture was supplied to a heating coil where it was raised to a temperature of 750° F. at which temperature it was maintained for a sufficient period of time to effect substantial conversion into aviation gasoline while employing a superatmospheric pressure of approximately 100 pounds per square inch.

The conversion products and catalyst were supplied to a separating zone maintained at substantially the same pressure as that employed on the outlet of the heating coil to separate the vaporous conversion products from the non-vaporous liquid residue and catalyst. The vaporous conversion products from the separating chamber were subjected to fractionation to separate fractionated vapors boiling substantially in the range of aviation gasoline from the higher boiling hydrocarbons and the latter condensed as reflux condensate. The reflux condensate was commingled with the heavy combined feed from the first mentioned fractionator and the mixture subjected to pyrolytic cracking treatment, as previously described. The fractionated vapors in the gasoline boiling range were subjected to cooling and condensation and the resulting distillate and gas recovered as products of the process.

The heavier of the two light combined feed fractions was commingled with the non-vaporous liquid residue and catalyst separated in the last mentioned separating chamber and the mixture supplied to the heating coil where it was raised to a temperature of approximately 950° F. and at which temperature it was maintained for a sufficient period of time to effect substantial catalytic cracking while employing a superatmospheric pressure of approximately 70 pounds per square inch. The conversion products and catalyst from this catalytic cracking treatment were supplied to a separating chamber maintained at substantially the same pressure as that employed on the outlet of the heating coil to separate vaporous conversion products from non-vaporous liquid residue and catalyst. The vaporous conversion products from this treatment were supplied to the first mentioned fractionator for treatment as previously described.

The non-vaporous liquid residue and catalyst from the last mentioned separating chamber were commingled with a cracked kerosene distillate to reduce the viscosity of the heavy non-vaporous liquid residue and the mixture was supplied to a settling chamber where separation of the catalyst and liquid hydrocarbons was effected and the latter was removed from the settling chamber by decantation and the diluent thereafter recovered from the non-vaporous liquid residue by fractionation. The catalyst remaining in the settling chamber was commingled with a portion of the lighter of the two light combined feed fractions, as previously described.

The operation resulted in a yield of 57.5% of 73 octane number motor gasoline, 8.5% of 76 octane number aviation base gasoline, and 16% of non-vaporous liquid residue, the balance being attributed to gas and loss.

I claim as my invention:

1. A process for producing anti-knock gasoline which comprises passing a mixture of relatively light hydrocarbon oil and a powdered cracking catalyst in a restricted stream through a heating zone and therein subjecting the mixture to catalytic conversion conditions, separating the resultant products into vapors and a residual liquid containing the powdered catalyst, adding to the residual liquid and catalyst a hydrocarbon oil heavier than the first-mentioned oil, subjecting the resultant mixture to independently controlled conversion conditions while flowing in a restricted stream through a second heating zone, and fractionating and condensing the vaporous products of said conversion treatments.

2. A conversion process which comprises thermally cracking heavy hydrocarbon oil, fractionating the resultant vaporous products to separate a relatively light reflux condensate and a heavier reflux condensate therefrom, commingling a powdered cracking catalyst with the light reflux condensate and subjecting the mixture to catalytic conversion conditions, separating the resultant products into vapors and a residual liquid containing the powdered catalyst, adding said heavier reflux condensate to the residual liquid containing the catalyst, subjecting the resultant mixture to independently controlled conversion conditions, and fractionating and condensing the vaporous products of the catalytic conversion steps.

3. A process for the conversion of hydrocarbons, which comprises subjecting heavy combined feed, formed as hereinafter set forth, to thermal cracking treatment, separating vaporous conversion products from non-vaporous liquid residue and recovering the latter, fractionating said vaporous conversion products, together with other vaporous conversion products, formed as hereinafter set forth, and charging oil, to separate fractionated vapors boiling in the range of gasoline and to form light combined feed fractions and a heavy combined feed fraction from the heavier hydrocarbons, cooling and condensing said fractionated vapors and recovering the resulting distillate and gas, subjecting said heavy combined feed fraction to treatment as aforesaid, commingling the lighter of said light combined feed fractions with a powdered cracking catalyst and subjecting the mixture to conversion at a cracking temperature, separating the vaporous materials from the non-vaporous liquid residue and catalyst, supplying said vaporous materials to the fractionation treatment as a portion of said other vaporous conversion products, commingling the residue and catalyst from the second conversion treatment with the heaveir of said light combined feed fractions and subjecting the mixture to conversion at a cracking temperature, separating vaporous conversion products formed in the last mentioned conversion treatment from non-vaporous liquid residue and catalyst and recovering the latter, and supplying the vaporous conversion products from said last mentioned conversion treatment to the fractionation treatment as another portion of said other vaporous conversion products.

4. A process for the conversion of hydrocarbons, which comprises subjecting heavy combined feed, formed as hereinafter set forth, to thermal cracking treatment, separating vaporous conversion products from non-vaporous liquid residue and recovering the latter, fractionating said vaporous conversion products, together with other vaporous conversion products, formed as hereinafter set forth, and charging oil, to separate fractionated vapors boiling in the range of gasoline and to form light combined feed fractions and a heavy combined feed fraction from the heavier hydrocarbons, cooling and condensing said fractionated vapors and recovering the resulting distillate and gas, subjecting said heavy combined feed fraction to treatment as aforesaid, commingling the lighter of said light combined feed fractions with a powdered cracking catalyst and subjecting the mixture to conversion at a cracking temperature, separating the vaporous materials from the non-vaporous liquid residue and catalyst, fractionating said vaporous materials to separate gasoline boiling range hydrocarbons from the higher boiling hydrocarbons, condensing the latter as reflux condensate and subjecting it to further cracking treatment, cooling and condensing said gasoline boiling range hydrocarbons and recovering the resulting distillate and gas, commingling the residue and catalyst from the second conversion treatment with the heavier of said light combined feed fractions and subjecting the mixture to conversion at a cracking temperature, separating vaporous conversion products formed in the last mentioned conversion treatment from non-vaporous liquid residue and catalyst and recovering the latter, and supplying the vaporous conversion products from said last mentioned conversion treatment to the fractionation treatment as said other vaporous conversion products.

5. The process claimed in claim 4 wherein the reflux condensate from the second fractionation treatment is commingled with the heavier of the light combined feed fractions prior to the conversion treatment of the latter in commingled state with the residue and catalyst from the second conversion treatment.

6. A process for the conversion of hydrocarbons, which comprises subjecting a charging oil, together with heavy reflux condensate, formed as hereinafter set forth, to thermal cracking treatment, separating vaporous conversion products from non-vaporous liquid residue and recovering the latter, fractionating said vaporous conversion products, together with other vaporous conversion products, formed as hereinafter set forth, to separate fractionated vapors boiling in the range of gasoline and to form light reflux condensate fractions and a heavy reflux condensate fraction from the heavier hydrocarbons, cooling and condensing said fractionated vapors and recovering the resulting distillate and gas, subjecting said heavy reflux condensate fraction to treatment as aforesaid, commingling the lighter of said light reflux condensate fractions with a powdered cracking catalyst and subjecting the mixture to conversion at a cracking temperature, separating the vaporous materials from the non-vaporous liquid residue and catalyst, fractionating said vaporous materials to separate gasoline boiling range hydrocarbons from the higher boiling hydrocarbons, condensing the latter as reflux condensate and subjecting it to further cracking treatment, cooling and condensing said gasoline boiling range hydrocarbons and recovering the resulting distillate and gas, commingling the residue and catalyst from the second conversion treatment with the heavier of said light reflux condensate fractions and subjecting the mixture to conversion at a cracking temperature, separating vaporous conversion products formed in the last mentioned conversion treatment from non-vaporous liquid residue and catalyst and recovering the latter, and supplying the vaporous conversion products from said last mentioned conversion treatment to the fractionation treatment as said other vaporous conversion products.

7. A process for the conversion of hydrocarbons, which comprises subjecting a charging oil, together with heavy reflux condensate, formed as hereinafter set forth, to thermal cracking treatment, separating vaporous conversion products from non-vaporous liquid residue and recovering the latter, fractionating said vaporous conversion products, together with other vaporous conversion products, formed as hereinafter set forth, to separate fractionated vapors boiling in the range of gasoline and to form light reflux condensate fractions and a heavy reflux condensate fraction from the heavier hydrocarbons, cooling and condensing said fractionated vapors and recovering the resulting distillate and gas, subjecting said heavy reflux condensate fraction to treatment as aforesaid, commingling the lighter of said light reflux condensate fractions with a powdered cracking catalyst and subjecting the mixture to conversion at a cracking temperature, separating the vaporous materials from the non-vaporous liquid residue and catalyst, fractionating said vaporous materials to separate gasoline boiling range hydrocarbons from the higher boiling hydrocarbons, condensing the latter as reflux condensate and subjecting it to further cracking treatment, cooling and condensing said gasoline boiling range hydrocarbons and recovering the resulting distillate and gas, commingling the residue and catalyst from the second conversion treatment with the heavier of said light reflux condensate fractions and subjecting the mixture to conversion at a cracking temperature, separating vaporous conversion products formed in the last mentioned conversion treatment from the non-vaporous liquid residue and catalyst and supplying the former to the fractionation treatment as said other vaporous conversion products, separating the liquid residue from the mixture of non-vaporous liquid residue and catalyst removed from the last mentioned separating treatment and recovering the same as a product of the process, and returning at least a portion of the recovered catalyst to the second mentioned conversion treatment for use therein, as previously set forth.

8. A process for the conversion of hydrocarbons, which comprises subjecting a charging oil, together with heavy reflux condensate, formed as hereinafter set forth, to thermal cracking treatment, separating vaporous conversion products from non-vaporous liquid residue and recovering the latter, fractionating said vaporous conversion products, together with other vaporous conversion products, formed as hereinafter set forth, to separate fractionated vapors boiling in the range of gasoline and to form light reflux condensate fractions and a heavy reflux condensate fraction from the heavier hydrocarbons, cooling and condensing said fractionated vapors and recovering the resulting distillate and gas, subjecting said heavy reflux condensate fraction to treatment as aforesaid, commingling the lighter of said light reflux condensate fractions with a powdered cracking catalyst and subjecting the mixture to conversion at a cracking temperature, separating the vaporous materials from the non-vaporous liquid residue and catalyst, supplying said vaporous materials to the fractionation treatment as a portion of said other vaporous conversion products, commingling the residue and catalyst from the second conversion treatment with the heavier of said light reflux condensate fractions and subjecting the mixture to conversion at a cracking temperature, separating the vaporous conversion products formed in the last mentioned conversion treatment from the non-vaporous liquid residue and catalyst and supplying the former to the fractionation treatment as another portion of said other vaporous conversion products, separating the liquid residue from the mixture of non-vaporous liquid residue and catalyst removed from the last mentioned separating treatment and recovering the same as a product of the process, and returning at least a portion of the recovered catalyst to the second mentioned conversion treatment for use therein as previously set forth.

9. A process for the conversion of hydrocarbons, which comprises subjecting a charging oil, together with heavy reflux condensate, formed as hereinafter set forth, to thermal cracking treatment, separating vaporous conversion products from non-vaporous liquid residue and recovering the latter, fractionating said vaporous conversion products, together with other vaporous conversion products, formed as hereinafter set forth, to separate fractionated vapors boiling in the range of gasoline and to form light reflux condensate fractions and a heavy reflux condensate fraction from the heavier hydrocarbons, cooling and condensing said fractionated vapors and recovering the resulting distillate and gas, subjecting said heavy reflux condensate fraction to treatment as aforesaid, commingling the lighter of said light reflux condensate fractions with a powdered cracking catalyst consisting essentially of silica composited with a compound selected from the group consisting of alumina, zirconia and alumina-zirconia, and subjecting the mixture to conversion at a cracking temperature, separating the vaporous materials from the non-vaporous liquid residue and catalyst, fractionating said vaporous materials to separate gasoline boiling range hydrocarbons from the higher boiling hydrocarbons, condensing the latter as reflux condensate and subjecting it to further cracking treatment, cooling and condensing said gasoline boiling range hydrocarbons and recovering the resulting distillate and gas, commingling the residue and catalyst from the second conversion treatment with the heavier of said light reflux condensate fractions and subjecting the mixture to conversion at a cracking temperature, separating vaporous conversion products formed in the last mentioned conversion treatment from the non-vaporous liquid residue and catalyst and supplying the former to the fractionation treatment as said other vaporous conversion products, separating the liquid residue from the mixture of non-vaporous liquid residue and catalyst removed from the last mentioned separating treatment and recovering the same as a product of the process, and returning at least a portion of the catalyst recovered to the second mentioned conversion treatment for use therein, as previously set forth.

10. A process for the conversion of hydrocarbons, which comprises subjecting a charging oil, together with heavy reflux condensate, formed as hereinafter set forth, to thermal cracking treatment, separating vaporous conversion products from non-vaporous liquid residue and recovering the latter, fractionating said vaporous conversion products, together with other vaporous conversion products, formed as hereinafter set forth, to separate fractionated vapors boiling in the range of gasoline and to form light reflux condensate fractions and a heavy reflux condensate fraction from the heavier hydrocarbons, cooling and condensing said fractionated vapors and recovering the resulting distillate and gas, subjecting said heavy reflux condensate fraction to treatment as aforesaid, commingling the lighter of said light reflux condensate fraction with a powdered cracking catalyst consisting essentially of silica composited with alumina and zirconia and subjecting the mixture to conversion at a temperature of from 500 to 900° F. and at a pressure of from substantially atmospheric to 200 pounds or more per square inch, separating the vaporous materials from the non-vaporous liquid residue and catalyst, fractionating said vaporous materials to separate gasoline boiling range hydrocarbons from the higher boiling hydrocarbons, condensing the latter as reflux condensate and subjecting it to further cracking treatment, cooling and condensing said gasoline boiling range hydrocarbons and recovering the resulting distillate and gas, commingling the residue and catalyst from the second conversion treatment with the heavier of said light reflux condensate fractions and subjecting the mixture to conversion at a temperature of from 900 to 1200° F. and at a pressure of from substantially atmospheric to 100 pounds per square inch, separating vaporous conversion products formed in the last mentioned conversion treatment from the non-vaporous liquid residue and catalyst and supplying the former to the fractionation treatment as said other vaporous conversion products, separating the liquid residue from the mixture of non-vaporous liquid residue and catalyst removed from the last mentioned separating treatment and recovering the same as a product of the process, and returning at least a portion of the catalyst recovered to the second mentioned conversion treatment for use therein, as previously set forth.

11. A process for the conversion of hydrocarbons, which comprises subjecting a charging oil, together with heavy reflux condensate, formed as hereinafter set forth, to thermal cracking treatment, separating vaporous conversion products from non-vaporous liquid residue and recovering the latter, fractionating said vaporous conversion products, together with other vaporous conversion products, formed as hereinafter set forth, to separate fractionated vapors boiling in the range of gasoline and to form light reflux condensate fractions and a heavy reflux condensate fraction from the heavier hydrocarbons, cooling and condensing said fractionated vapors and recovering the resulting distillate and gas, subjecting said heavy reflux condensate fraction to treatment as aforesaid, commingling the lighter of said light reflux condensate fractions with a powdered cracking catalyst consisting essentially of silica composited with alumina and zirconia and subjecting the mixture to conversion at a temperature of from 800 to 1200° F. and at a pressure of from substantially atmospheric to 100 pounds per square inch, separating the vaporous materials from the non-vaporous liquid residue and catalyst, supplying said vaporous materials to the fractionation treatment as a portion of said other vaporous conversion products, commingling the residue and catalyst from the second conversion treatment with the heavier of said light reflux condensate fractions and subjecting the mixture to conversion at a temperature of from 800 to 1200° F. and at a pressure of from substantially atmospheric to 100 pounds per square inch, separating the vaporous conversion products formed in the last mentioned conversion treatment from the non-vaporous liquid residue and catalyst and supplying the former to the fractionation treatment as another portion of said other vaporous conversion products, separating the liquid residue from the mixture of non-vaporous liquid residue and catalyst removed from the last mentioned separating treatment and recovering the same as a product of the process, and returning at least a portion of the catalyst recovered to the second mentioned conversion treatment for use therein, as previously set forth.

GORDON B. ZIMMERMAN.